United States Patent Office 2,995,579
Patented Aug. 8, 1961

2,995,579
1-AMINO-2-ANTHRAQUINOYLAMINO-DINAPHTHOFURANDIONES
Mario Francesco Sartori, Wilmington, Del., assignor to E. I. du Pont de Nemours and Company, Wilmington, Del., a corporation of Delaware
No Drawing. Filed June 30, 1958, Ser. No. 745,261
4 Claims. (Cl. 260—346.2)

This invention deals with novel vat dyes. More particularly, this invention deals with novel 1-amino-2-anthraquinoylamino-dinaphthofurandiones, which may be represented by the general formula

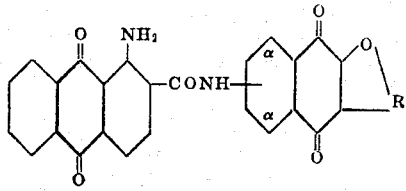

In this formula, R is the ortho-bivalent radical of a bicyclic aromatic compound which is free of water-solubilizing groups, for instance it may be the 1,2-radical of α-napthol, β-napthol or 2-hydroxy-3-naphthanilide, and the CONH group is attached in one of the α-positions of the naphthoquinone radical. This invention embraces both the individual isomers thus defined and mixtures of the two.

I find that compounds of the above formula are red vat dyes of good general fastness properties (washing- and light-fastness) and of particularly outstanding fastness to chlorine bleach. They also possess good vat stability; that is, the reduced dye does not undergo any substantial degradation over a long period of time and over a wide range of temperature.

My novel compounds may be prepared by condensing an amino-dinaphthofurandione of the formula

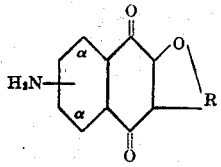

wherein R has the same significance as above and the NH₂ group is attached in one of the α-positions of the naphthoquinone radical, with 1-amino-2-anthraquinonecarbonyl chloride, or with the corresponding 1-nitro compound to be followed by treatment with ammonia, whereby to replace the NO₂ group by NH₂.

The initial amino-dinaphthofurandiones are themselves new compounds described and claimed in my copending application Serial No. 715,489, filed February 17, 1958, now abandoned, and may be prepared in single isomer form or as a mixture of both α-isomers, as more fully taught in my said copending application and illustrated in Examples 6 to 8 below.

Without limiting this invention, the following examples are given to illustrate my preferred mode of operation. Parts mentioned are by weight.

Example 1

3.1 parts of a mixture of 8-amino- and 11-aminodinaphtho[1,2-2′,3′]furan-7,12-dione, obtained following the procedure described in Example 2 of my application Serial No. 715,489 (Example 7 below), was slurried in 60 parts of o-dichlorobenzene, and then 3.5 parts of 1-nitro-2-anthraquinonecarbonyl chloride were added. The reaction mass was heated to 130° to 140° C. in one hour, and stirred at this temperature for 6 hours. The red-orange slurry was then cooled to 70° C. and the precipitate was filtered off. The product was washed with ethanol, slurried at 90° C. for 30 minutes in 250 parts of water which was kept alkaline with sodium carbonate. The intermediate, thus prepared, was filtered hot, washed alkali-free, and dried.

The dried scarlet colored powder was then slurried in 100 parts of nitrobenzene and heated to 175° to 180° C. for 9 hours, while passing a gentle stream of ammonia gas into the slurry. The reaction mixture was cooled to 70° C. and the precipitate was filtered off, washed with ethanol, and dried. An orange red powder, which gives a blue color in concentrated sulfuric acid, was obtained. It dyes cotton, from a red alkaline hydrosulfite vat, red shades of very good fastness properties.

This dye is a mixture of two isomers represented by the formula

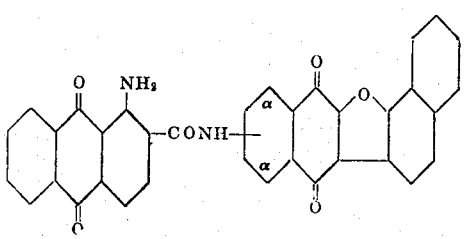

Example 2

A mixture of 3.5 parts of 1-nitro-2-anthraquinonecarbonyl chloride, 3.0 parts of 11-aminodinaphtho[1,2-2′,3′]furan-7,12-dione of M.P. 302° to 304° C. (prepared as in Example 12 of my copending application, Serial No. 715,489 and summarized in Example 8 below), and 80 parts of o-dichlorobenzene was heated, and the product was isolated as described in Example 1. The product thus obtained, 1-nitro-2-anthraquinoylaminodinaphthofurandione, was then reacted with ammonia and the reaction product was isolated as described in Example 1. An orange red powder was obtained, which dyes cotton red shades of very good fastness properties. It has the formula:

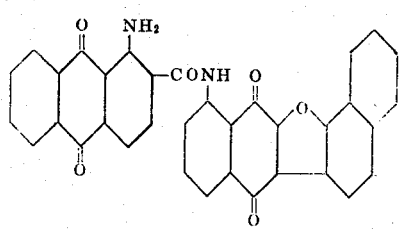

When the 11-aminodinaphtho[1,2-2′,3′]furan-7,12-dione, in the procedure of this example, is replaced by an equal amount of the 8-amino isomer of M.P. 362° to 364° C. (obtained as in Example 12 of my copending application), a vat dye of isomeric formula and practically equal shade and fastness properties is obtained.

Example 3

The amination step of Examples 1 to 2 may be eliminated by condensing, for instance, one mole of 11-aminodinaphthol[1,2-2′,3′]furan-7,12-dione with 1.2 moles of 1-amino-2-anthraquinonecarbonyl chloride in o-dichlorobenzene at 130° to 140° C. for 6 hours. The reaction mass is then cooled to 70° C., the precipitate is filtered off, slurried with an aqueous sodium carbonate solution at 90° C. as described in Example 1 and filtered again. The product has the same formula as shown for the 11-isomer in Example 2 and dyes cotton red shades of fastness properties equal to those obtained with the vat dye of Example 2.

Example 4

3.1 parts of a mixture of 9-amino- and 12-aminodinaphtho[2,1-2',3']furan-8,13-diones obtained following the procedure described in Example 5 of my application Serial No. 715,489 (and summarized under Example 7 below), was slurried in 60 parts of o-dichlorobenzene, and to the suspension were added 3.5 parts of 1-nitro-2-anthraquinonecarbonyl chloride. The reaction mass was heated to 130 to 140° C. in one hour and stirred at this temperature for 6 hours. The orange product was isolated, purified and reacted with ammonia as described in Example 1 above. An orange red powder was obtained. It dyes cotton red shades of very good fastness properties.

This dye is a mixture of two isomers, represented by the formula

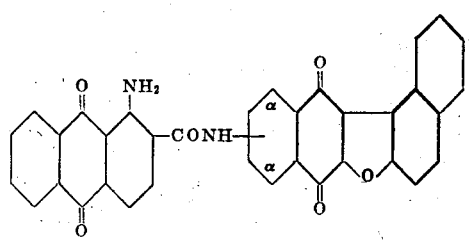

When the mixture of 9-amino- and 12-aminodinaphtho[2,1-2',3']furan-8,13-diones is replaced, in the procedure of this example, by an equal amount of the 9-aminodinaphtho[2,1-2',3']furan-8,13-dione of M.P. 298° to 300° C., or by an equal amount of the 12-amino isomer (of M.P. 338° C.), prepared as in Example 10 of my application Serial No. 715,489 (and summarized under Example 8 below), the corresponding, single-isomer, cis and trans forms of the red vat dyes are obtained.

Example 5

4.3 parts of a mixture of 9-amino- and 12-amino-8,13-dioxodinaphtho[2,1-2',3']furan-6-carboxanilide (prepared as described in Part I of my copending application Serial No. 736,445, filed May 20, 1958, now U.S. Patent No. 2,893,998) were slurried in 100 parts of o-dichlorobenzene, and 3.8 parts of 1-nitro-2-anthraquinonecarbonyl chloride were added. The suspension was heated to 130° to 140° C. in one hour and stirred at this temperature for three hours. The condensation product was filtered, purified and reacted with ammonia as described in Example 1 of this application. An orange red powder was obtained. It dyes cotton in red shades of good fastness properties. This red dye is a mixture of the cis and trans isomers which may be represented by the formula

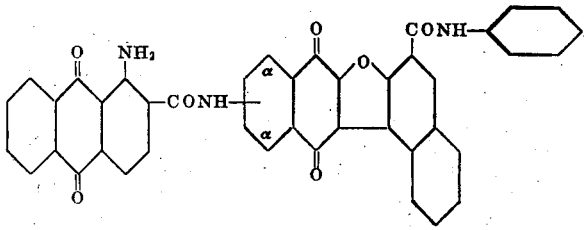

the CONH group of the anthraquinone radical being attached in one of the α-positions of the naphthoquinone radical.

It will be understood that the details of the above examples may be varied within the skill of those engaged in this art. For instance, in lieu of starting with the mixture of 9-amino- and 12-amino-8,13-dioxodinaphtho[2,1-2',3']furan-6-carboxanilide in Example 5 and obtaining a mixed vat dye, one may start with the individual isomers to produce the pure cis or trans isomer of the vat dye. The preparation of said individual amino isomers may be achieved by separating into its isomers the mixture of the corresponding nitro compounds obtained in Part I of my said application Serial No. 736,445, by the aid of their differential solubility in concentrated sulfuric acid, and then reducing the individual isomers, as more fully described in my application Serial No. 715,489 for the analogous simple nitro-dinaphthofurandiones.

The new vat dyes of this invention are used to color cellulosic fibers from an alkaline hydrosulfite vat in red shades.

The following examples have been transcribed or condensed from the various examples in my aforementioned copending application Serial No. 715,489:

Example 6.—Nitrodinaphthofuran-dione, mixture

A solution of 15.8 parts of alpha naphthol in 300 parts of pyridine is agitated at room temperature and 27.2 parts of 2,3-dichloro-5-nitronaphthoquinone are added. A dark brown suspension is formed and the temperature rises to 50° C. The temperature is then raised to 110° C. over a 1 hour period, and the reaction mass is kept at this temperature for 3 to 4 hours. After cooling and stirring for 12 hours at room temperature, the precipitate is filtered off, washed with alcohol and dried. After further washing with hot water and drying, nitrodinaphtho[1,2-2',3']furan-7,12-dione (mixed isomers) is obtained as a bright orange powder; M.P. 312-314° C.

When beta naphthol is used in lieu of alpha naphthol in the above example, a mixed nitrodinaphtho[2,1-2',3']furan-8,13-dione product, melting at 280° C., is obtained.

Example 7.—Aminodinaphthofuran-dione, mixture

A flask, equipped with stirrer, thermometer and condenser, is charged with 700 parts of water, 500 parts of 30% sodium hydroxide solution and 125 parts of sodium hydrosulfite. A fine aqueous slurry of 34.5 parts of the first nitrodinaphthofuran-dione of Example 6 is added, while stirring, over about a 10 minute period. Nitrogen gas is swept through the solution thus obtained, and while maintaining the temperature of the reaction mixture at 35° to 40° C., agitation is continued for one hour. Air is then passed through the clear reddish solution until complete oxidation takes place. The red precipitate is filtered off, washed with water and dried. A dark red powder is obtained, which, after recrystallization from nitrobenzene, melted at 321° to 323° C.

When the mixed nitro product obtained from beta naphthol in Example 6 is subjected to the procedure of this example, a mixture of aminodinaphtho[2,1-2',3']furan-8,13-diones is obtained in the form of dark red crystals which melt at 292° to 296° C.

Example 8.—Separation of isomers 10 parts of the mixed nitro product obtained in Example 6 from beta naphthol are stirred at 15° to 18° C. for 1 hour with 735 parts of concentrated sulfuric acid (96%). The insoluble material is collected, washed first with concentrated sulfuric acid then with ice water, dried and crystallized from o-dichlorobenzene to yield yellow needles of M.P. 342°-344° C. (5.5 parts). The absorption maximum of this compound in o-dichlorobenzene is located at 468 millimicrons.

The sulfuric acid solution, comprising the filtrate, is drowned on ice to a final $H_2SO_4$ concentration of 5%, and gives a red precipitate (4.0 parts), which after crystallization from o-dichlorobenzene yields orange crystals (3.5 parts) of M.P. 312°-316° C. The adsorption maximum of this compound in o-dichlorobenzene is located at 468 millimicrons.

When the above separated nitro isomers are subjected to reduction in alkaline aqueous sodium hydrosulfite, at 35°-40° C., followed by aeration and recovery of the precipitate, essentially as set forth in Example 7, the corresponding separated amino isomers are obtained. The nitro isomer which melts at 342°-344° C. yields an amino compound in the form of violet feathery needles, which melt at 298°-300° C. The absorption maximum of this amine in o-dichlorobenzene is located at 500 millimicrons.

The nitro isomer which melts at 312°–316° C. yields an amino compound having the form of dark brown crystals of M.P. 338° C. The absorption maximum of this isomer in o-dichlorobenzene is located at 450 millimicrons.

When the mixed produce obtained in Example 6 from alpha naphthol is subjected to a separation procedure as above, it yields two isomers melting, respectively, at 344°–346° C. and at 320°–324° C. The nitro isomer of M.P. 344°–346° C., when reduced as in this example, yields an amine melting at 302°–304° C. and having an absorption maximum in o-dichlorobenzene at 498 millimicrons. The nitro isomer of M.P. 320°–324° C. yields under the same conditions an amine which melts at 362°–364° C. and whose absorption maximum in o-dichlorobenzene is located at 440 millimicrons.

I claim as my invention:

1. A compound of the formula

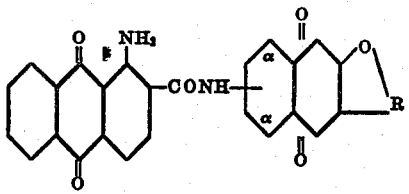

wherein R is an ortho-bivalent radical of the group consisting of

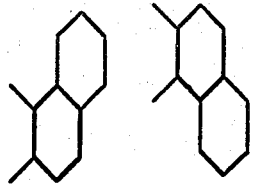

and

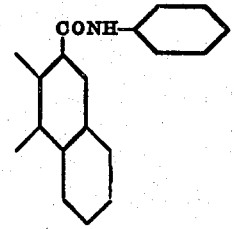

the CONH group of the anthraquinone radical being attached in one of the α-positions of the naphthaquinone radical.

2. A vat dye being a mixture of the two isomers represented by the formula

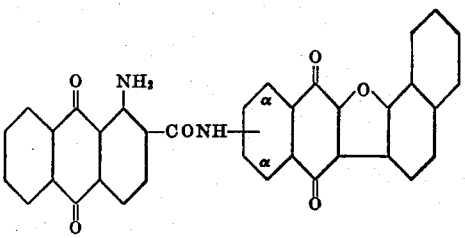

the CONH group of the anthraquinone radical being attached in one of the α-positions of the naphthaoquinone radical.

3. A vat dye being a mixture of the two isomers represented by the formula

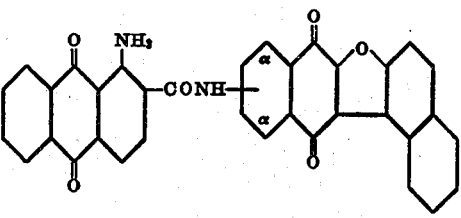

the CONH group of the anthraquinone radical being attached in one of the α-positions of the naphthaoquinone radical.

4. A vat dye being a mixture of the two isomers represented by the formula

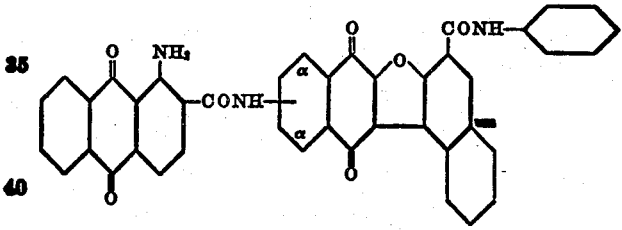

the CONH group of the anthraquinone radical being attached in one of the α-positions of the naphthaoquinone radical.

References Cited in the file of this patent

UNITED STATES PATENTS

| | | |
|---|---|---|
| 2,813,875 | Schmidt-Nickels | Nov. 19, 1957 |
| 2,870,168 | Randall et al. | Jan. 20, 1959 |

UNITED STATES PATENT OFFICE
CERTIFICATION OF CORRECTION

Patent No. 2,995,579                                  August 8, 1961

Mario Francesco Sartori

It is hereby certified that error appears in the above numbered patent requiring correction and that the said Letters Patent should read as corrected below.

Column 2, line 56, after "my" insert -- said --; line 61, for "Examples 1 to 2" read -- Example 1 or 2 --; line 63, for "dinaphthol" read -- dinaphtho --; same line 63, for "1.2 moles" read -- 1.1 moles --; column 4, line 63, for "adsorption" read -- absorption --; column 5, lines 18 to 25, the structural formula should appear as shown below instead of as in the patent:

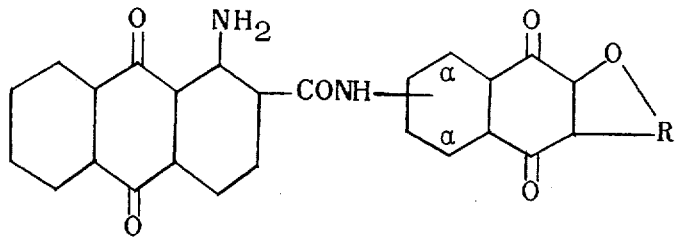

Signed and sealed this 30th day of January 1962.

(SEAL)
Attest:

ERNEST W. SWIDER                                DAVID L. LADD
Attesting Officer                            Commissioner of Patents